(12) United States Patent
Groninga et al.

(10) Patent No.: US 10,407,169 B2
(45) Date of Patent: Sep. 10, 2019

(54) AIRCRAFT HAVING DUAL ROTOR-TO-WING CONVERSION CAPABILITIES

(71) Applicant: Bell Helicopter Textron Inc., Fort Worth, TX (US)

(72) Inventors: Kirk Landon Groninga, Fort Worth, TX (US); Daniel Bryan Robertson, Fort Worth, TX (US); Frank Bradley Stamps, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 599 days.

(21) Appl. No.: 15/251,110

(22) Filed: Aug. 30, 2016

(65) Prior Publication Data

US 2018/0057161 A1 Mar. 1, 2018

(51) Int. Cl.
*B64C 29/02* (2006.01)
*B64C 11/00* (2006.01)
(Continued)

(52) U.S. Cl.
CPC .............. *B64C 29/02* (2013.01); *B64C 11/00* (2013.01); *B64C 25/52* (2013.01); *B64C 27/24* (2013.01);
(Continued)

(58) Field of Classification Search
CPC ........... B64C 3/56; B64C 11/00; B64C 25/52; B64C 27/24; B64C 27/50; B64C 29/02; B64C 39/08; B64D 27/24
(Continued)

(56) References Cited

U.S. PATENT DOCUMENTS

| 2,328,786 | A | * | 9/1943 | Crowder | ................. B64C 29/02 |
|  |  |  |  |  | 244/17.23 |
| 2,382,460 | A | * | 8/1945 | Young | .................... B64C 29/02 |
|  |  |  |  |  | 244/17.19 |

(Continued)

FOREIGN PATENT DOCUMENTS

| JP | 2005319970 A | * | 11/2005 | ............. B64C 27/10 |
| JP | 2005319970 A |  | 11/2005 |  |

(Continued)

OTHER PUBLICATIONS

European Search Report, Application No. 17163294.6, EPO, dated Oct. 5, 2017.
(Continued)

*Primary Examiner* — Richard R. Green
*Assistant Examiner* — Brady W Frazier
(74) *Attorney, Agent, or Firm* — Lawrence Youst PLLC

(57) ABSTRACT

A tail sitter aircraft includes a fuselage having a forward portion and an aft portion. The forward portion of the fuselage includes first and second rotor stations. A first rotor assembly is positioned proximate the first rotor station. A second rotor assembly is positioned proximate the second rotor station. A tailboom assembly extends from the aft portion of the fuselage and includes a plurality of landing members. A pusher propeller extends from the tailboom assembly. In a vertical takeoff and landing mode, the first and second rotor assemblies rotate about the fuselage to provide vertical thrust. In a forward flight mode, rotation of the pusher propeller provides forward thrust and the first and second rotor assemblies are non-rotatable about the fuselage forming a dual wing configuration to provide lift.

20 Claims, 6 Drawing Sheets

(51) Int. Cl.
    *B64C 25/52*     (2006.01)
    *B64C 27/24*     (2006.01)
    *B64C 27/50*     (2006.01)
    *B64C 39/08*     (2006.01)
    *B64D 27/24*     (2006.01)
    *B64C 3/56*     (2006.01)

(52) U.S. Cl.
    CPC .............. *B64C 27/50* (2013.01); *B64C 39/08* (2013.01); *B64D 27/24* (2013.01); *B64C 3/56* (2013.01)

(58) Field of Classification Search
    USPC .......................................................... 244/7 B
    See application file for complete search history.

(56) References Cited

U.S. PATENT DOCUMENTS

| | | | | |
|---|---|---|---|---|
| 2,387,762 A * | 10/1945 | Leonard | .............. | B64C 29/0025 244/67 |
| 2,397,632 A * | 4/1946 | Stuart | .................... | B64C 29/02 244/17.23 |
| 2,622,826 A * | 12/1952 | Prince | .................... | B64C 29/02 244/17.21 |
| 2,665,082 A * | 1/1954 | Anderson | ................ | B64C 29/02 244/52 |
| 2,678,783 A * | 5/1954 | Myers | ................. | B64C 29/0091 244/102 R |
| 2,684,213 A * | 7/1954 | Robert | ................ | B64C 29/0091 244/139 |
| 2,879,013 A * | 3/1959 | Herrick | ............... | B64C 29/0025 244/221 |
| 3,592,412 A * | 7/1971 | Glatfelter | ............ | B64C 29/0033 244/7 A |
| 4,793,572 A * | 12/1988 | Mecca | .................... | B64C 27/24 244/7 A |
| 5,289,994 A * | 3/1994 | Del Campo Aguilera | .................. | B64C 27/22 244/12.1 |
| 5,516,060 A * | 5/1996 | McDonnell | ............. | B64C 29/02 244/207 |
| 6,398,157 B1 * | 6/2002 | Ingram | .................... | B64C 3/40 244/7 B |
| 6,561,455 B2 * | 5/2003 | Capanna | ................. | B64C 29/02 244/7 A |
| 8,146,854 B2 * | 4/2012 | Lawrence | ............. | B64C 39/024 244/17.23 |
| 2004/0200924 A1 * | 10/2004 | Clark, Jr. | ............... | A63H 27/12 244/7 B |
| 2006/0255205 A1 * | 11/2006 | Gleich | .................. | B64C 39/024 244/49 |
| 2014/0312177 A1 * | 10/2014 | Gaonjur | .................. | B64C 27/24 244/7 A |
| 2017/0144746 A1 * | 5/2017 | Schank | .................... | B64C 11/28 |

FOREIGN PATENT DOCUMENTS

| | | |
|---|---|---|
| RU | 2658736 C1 | 6/2018 |
| WO | 1998002350 A1 | 1/1998 |
| WO | 2016085610 A1 | 6/2016 |

OTHER PUBLICATIONS

European Examination Report, Application No. 17163294.6, EPO, dated Oct. 24, 2017.

European Examination Report, Application No. 17163294.6, EPO, dated Sep. 13, 2018.

\* cited by examiner

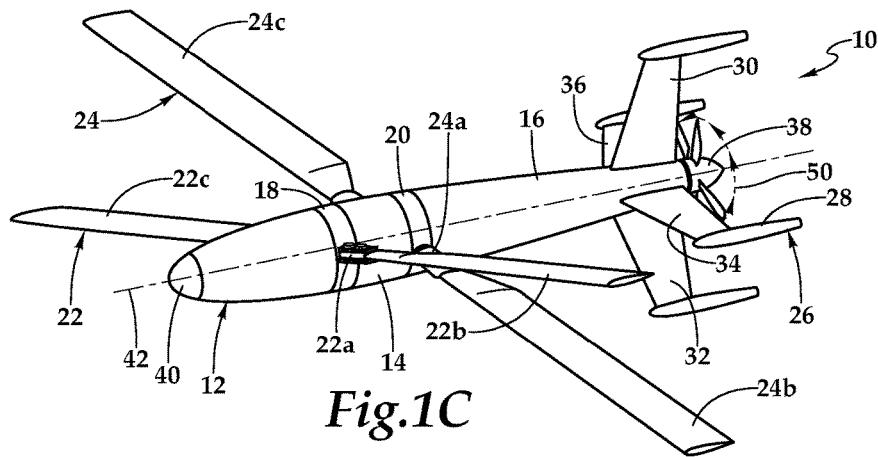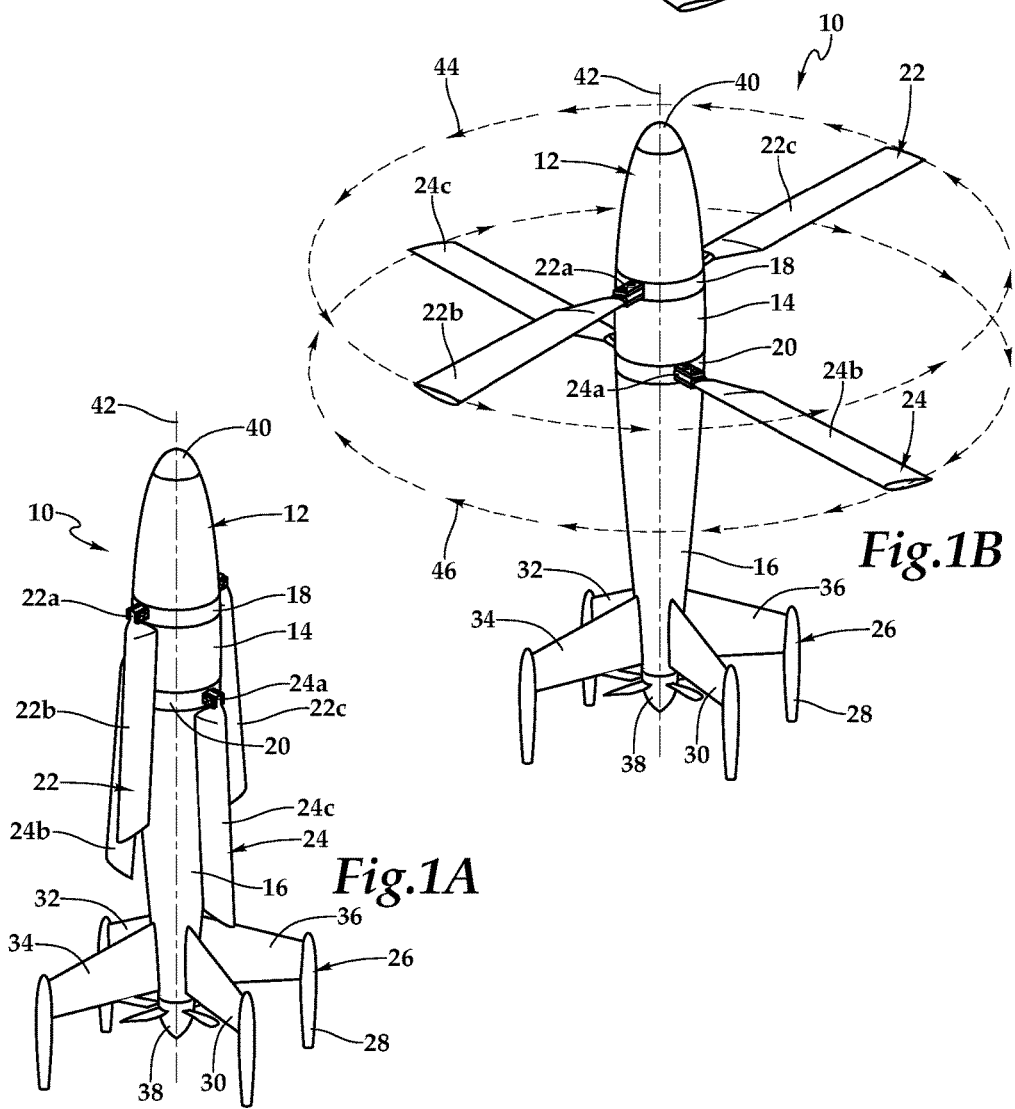

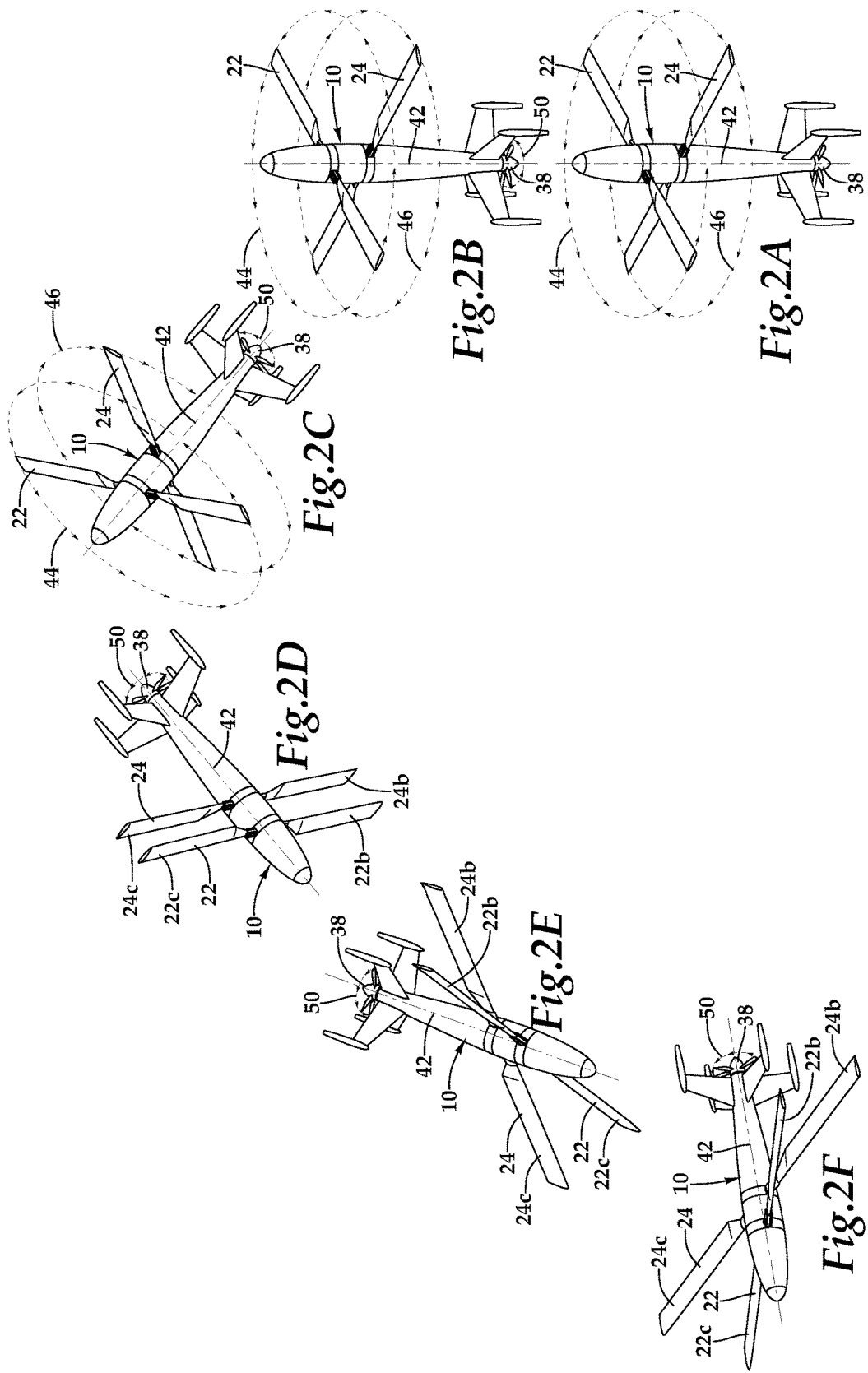

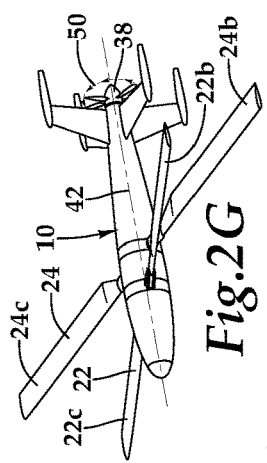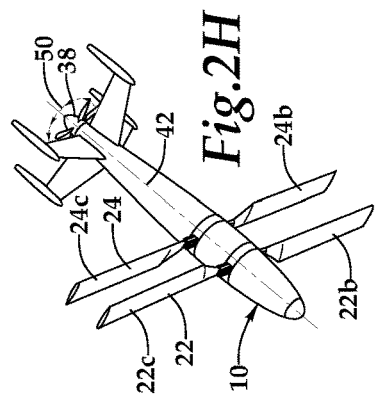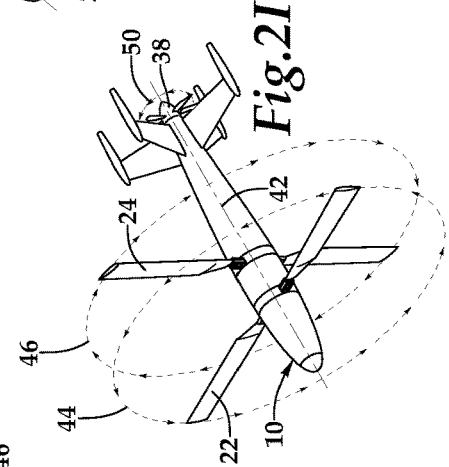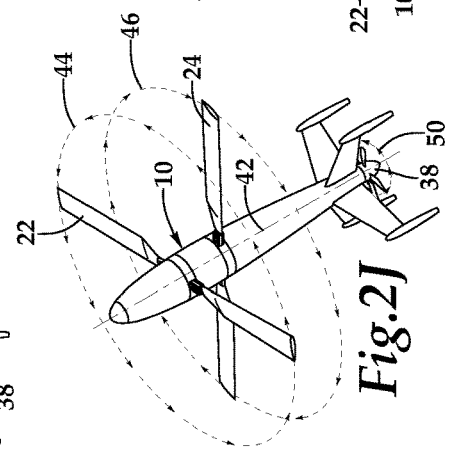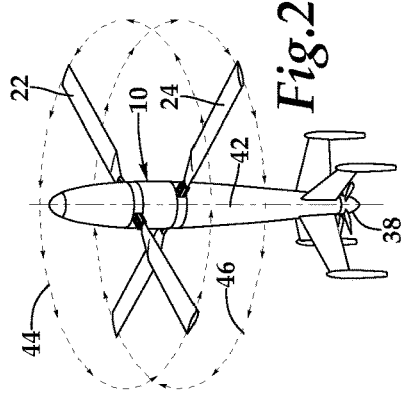

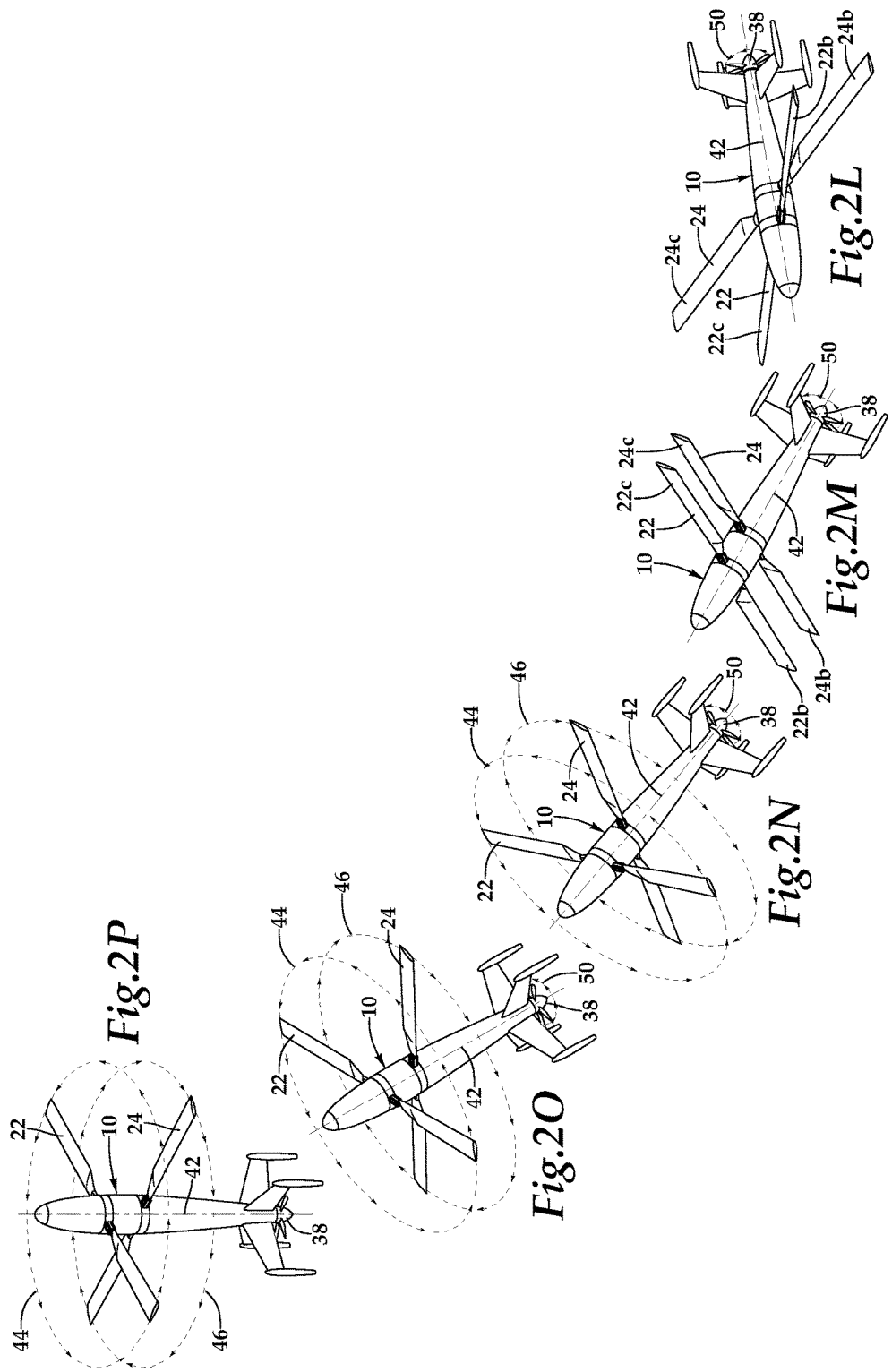

AIRCRAFT HAVING DUAL ROTOR-TO-WING CONVERSION CAPABILITIES

TECHNICAL FIELD OF THE DISCLOSURE

The present disclosure relates, in general, to aircraft that take off and land on their tail and tilt horizontally for forward flight and, in particular, to tail sitter aircraft operable to transition between a dual rotor configuration for vertical takeoff and landing and an x-wing configuration in combination with a pusher propeller for forward flight.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, may suffer from downwash inefficiencies during vertical takeoff and landing due to interference caused by the fixed wing.

Tiltwing aircraft feature a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, may be difficult to control during hover as the vertically oriented wing provides a large surface area for crosswinds, typically requiring tiltwing aircraft to have either cyclic rotor control or an additional thrust station to generate a moment.

Tail sitter aircraft land on and take off from their tail section. The longitudinal fuselage axis of a tail sitter aircraft is generally vertical for hover, takeoff and landing and generally horizontal during forward flight. A rotary propulsion system is typically used to generate vertical thrust during takeoff, hover and landing. Horizontal thrust generated by the rotary propulsion system in combination with lift generated by one or more fixed wings enables forward flight. Tail sitter aircraft, however, may lack endurance due to propulsion system inefficiencies during forward flight.

SUMMARY

In a first aspect, the present disclosure is directed to a tail sitter aircraft including a fuselage having a forward portion and an aft portion. The forward portion of the fuselage includes first and second rotor stations. A first rotor assembly is positioned proximate the first rotor station. A second rotor assembly is positioned proximate the second rotor station. A tailboom assembly extends from the aft portion of the fuselage and includes a plurality of landing members. A pusher propeller extends from the tailboom assembly. In a vertical takeoff and landing mode, the first and second rotor assemblies rotate about the fuselage to provide vertical thrust. In a forward flight mode, rotation of the pusher propeller provides forward thrust and the first and second rotor assemblies are non-rotatable about the fuselage forming a dual wing configuration to provide lift.

In some embodiments, the first and second rotor assemblies may each include two rotor blades. In certain embodiments, the first and second rotor assemblies may each have cyclic control and collective control. In some embodiments, the first and second rotor assemblies may be generally torque matched in vertical takeoff and landing mode. In certain embodiments, the first and second rotor assemblies may rotate in opposite directions in vertical takeoff and landing mode. In some embodiments, the pusher propeller may be a fixed pitch pusher propeller. In certain embodiments, the pusher propeller may not be powered in vertical takeoff and landing mode.

In some embodiments, the dual wing configuration may be an x-wing configuration. In certain embodiments, the dual wing configuration may provide roll control in forward flight mode. In some embodiments, the tail sitter aircraft may include an engine, such as an electrical motor, operable to provide torque and rotational energy to the first and second rotor assemblies and the pusher propeller. In other embodiments, one engine may provide torque and rotational energy to the first and second rotor assemblies and another engine may provide torque and rotational energy to the pusher propeller. In certain embodiments, the rotor blades may be foldable such that the rotor blades may be positioned generally parallel with a longitudinal fuselage axis to reduce aircraft geometry in a storage mode of the aircraft.

In a second aspect, the present disclosure is directed to a method of operating a tail sitter aircraft. The method includes supporting a fuselage in a generally vertical attitude on a surface with a plurality of landing members of a tailboom assembly; rotating first and second rotor assemblies about the fuselage to provide vertical thrust in a vertical takeoff and landing mode; rotating a pusher propeller to provide forward thrust in a forward flight mode; and forming a dual wing configuration with the first and second rotor assemblies by preventing rotation of the first and second rotor assemblies about the fuselage to provide lift in the forward flight mode.

The method may also include operating the first and second rotor assemblies responsive to cyclic control and collective control; generally torque matching the first and second rotor assemblies; rotating the first and second rotor assemblies in opposite directions; forming an x-wing configuration with the first and second rotor assemblies; performing a dual rotor-to-wing conversion of the first and second rotor assemblies by stopping the rotation of the first and second rotor assemblies about the fuselage and adjusting an angle of attack of each rotor blade of the first and second rotor assemblies and/or performing a dual wing-to-rotor conversion of the first and second rotor assemblies by reengaging rotation of the first and second rotor assemblies about the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of a tail sitter aircraft operable for dual rotor-to-wing conversion in accordance with embodiments of the present disclosure;

FIGS. 2A-2P are schematic illustrations of a tail sitter aircraft operable for dual rotor-to-wing conversion in sequential flight operating scenarios in accordance with embodiments of the present disclosure;

DETAILED DESCRIPTION

Figure 3:
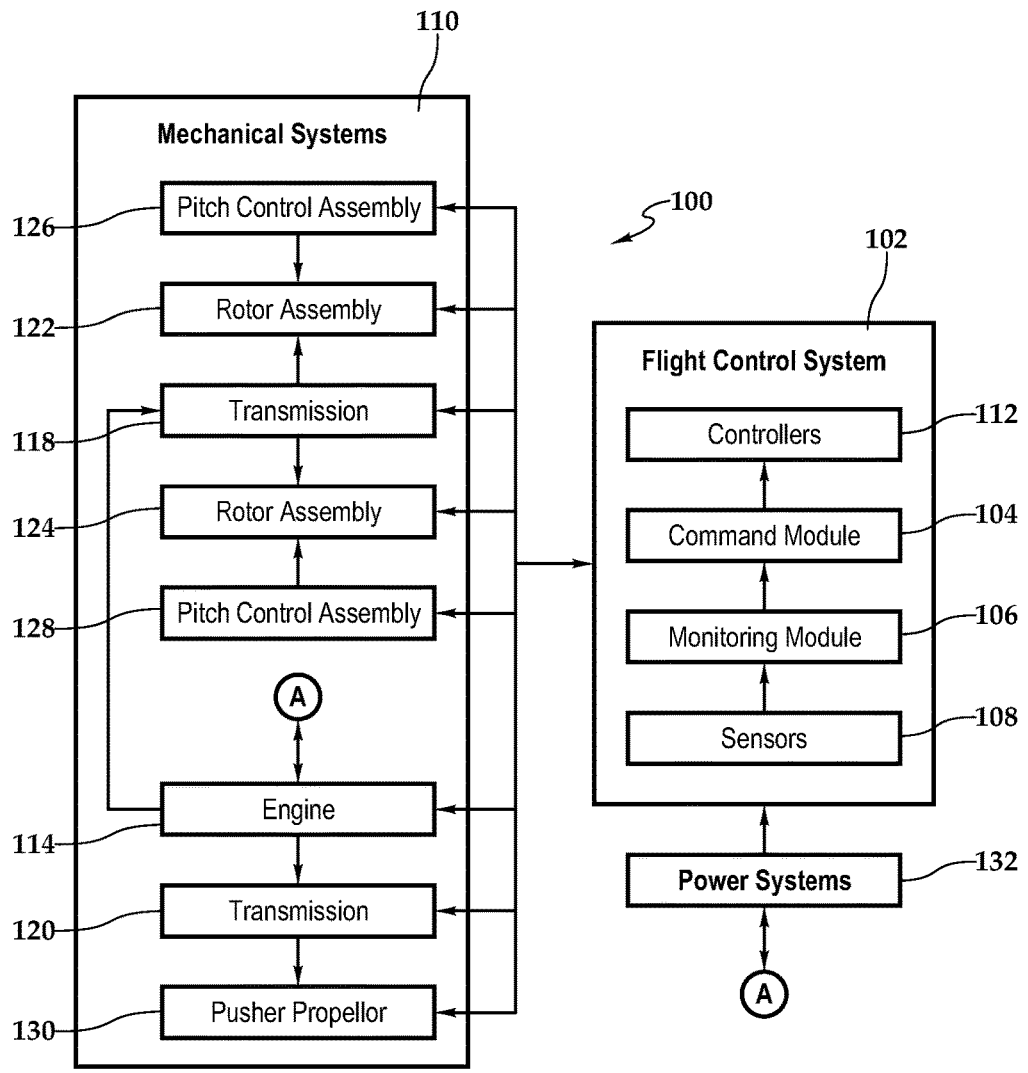
FIG. 3 is a systems diagram of a tail sitter aircraft operable for dual rotor-to-wing conversion in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C in the drawings, a tail sitter aircraft operable for dual rotor-to-wing conversion is schematically illustrated and generally designated 10. Aircraft 10 includes a fuselage 12 having a forward portion 14 and an aft portion 16. Forward portion 14 of fuselage 12 includes two rotor stations 18, 20. A rotor assembly 22 is located at rotor station 18 and a rotor assembly 24 is located at rotor station 20. Rotor assembly 22 includes a rotor hub 22a having blades 22b, 22c coupled thereto. Likewise, rotor assembly 24 includes a rotor hub 24a having blades 24b, 24c coupled thereto. As discussed herein, blades 22b, 22c of rotor assembly 22 and blades 24b, 24c of rotor assembly 24 are operable to act as rotor blades when aircraft 10 is operating in vertical takeoff and landing mode, as best seen in FIG. 1B, and as wings when aircraft 10 is operating in forward flight mode, as best seen in FIG. 1C.

A tailboom assembly 26 extends from aft portion 16 of fuselage 12. In the illustrated embodiment, tailboom assembly 26 includes a plurality of landing members 28 such as fixed or retractable skid members or shock absorbing members such as a pneumatic shock struts or mechanical spring assemblies. Landing members 28 may also include wheels (not pictured) to assist in ground maneuvers. Tailboom assembly 26 includes a plurality of control surfaces used during forward flight depicted as rudders 30, 32 for yaw control and elevators 34, 36 for pitch control, in the illustrated configuration. It is noted that tail sitter aircraft 10 may fly in other orientations wherein the control surfaces may serve alternate functions. A pusher propeller 38 extends from tailboom assembly 26. Preferably, aircraft 10 includes a sensor system 40 located in the nose of fuselage 12. Sensor system 40 may include positioning sensors, attitude sensors, speed sensors, environmental sensors, temperature sensors, target sensors and the like. Alternatively or additionally, sensor system 40 may include surveillance systems such as a spherical camera that may be pointed at any target of interest forward of rotor assembly 22.

Aircraft 10 may be an unmanned aircraft system (UAS), also known as an unmanned aerial vehicle (UAV) or a drone, that is self-powered, does not carry a human operator, uses aerodynamic forces to provide vehicle lift, is autonomously and/or remotely operated, may be expendable or recoverable and may carry lethal or nonlethal payloads. In such embodiments, aircraft 10 may be used in military, commercial, scientific, recreational and other applications. In addition, groups of aircraft, similar or identical to aircraft 10, may be networked together such that they are capable of cooperating with one another and exhibiting swarm behavior including, for example, the ability to dynamically adapt responsive to changing conditions or parameters, the ability for group coordination, distributed control, distributed tactical group planning, distributed tactical group goals, distributed strategic group goals and/or fully autonomous swarming. In one example, one or more aircraft 10 may engage a target by launching missiles from aft portion 16 of fuselage 12, when aircraft 10 is in forward flight mode. Alternatively, aircraft 10 could be a manned aircraft operable for onboard pilot control over some or all aspects of flight operations.

As best seen in FIG. 1A, aircraft 10 has a storage mode in which aircraft 10 has a small ground geometry. As illustrated, blades 22b, 22c of rotor assembly 22 are foldable relative to rotor hub 22a such that blades 22b, 22c extend in the aft direction generally parallel to a longitudinal fuselage axis 42 of aircraft 10. Similarly, blades 24b, 24c of rotor assembly 24 are foldable relative to rotor hub 24a such that blades 24b, 24c extend in the aft direction generally parallel to longitudinal fuselage axis 42 of aircraft 10. As illustrated, rotor assembly 22 and rotor assembly 24 are clocked at ninety degrees relative to each other in storage mode. Preferably, blades 22b, 22c are coupled to rotor hub 22a at lockable hinge members that are operable to lock blades 22b, 22c in the radially extending operating configuration of FIGS. 1B and 1C, and in the aftwardly extending storage configuration of FIG. 1A. Likewise, blades 24b, 24c are coupled to rotor hub 24a at lockable hinge members that are operable to lock blades 24b, 24c in the radially extending operating configuration of FIGS. 1B and 1C, and in the aftwardly extending storage configuration of FIG. 1A.

Operation of blades 22b, 22c and blades 24b, 24c between the radially extending operating configuration and the aftwardly extending storage configuration is preferably manual, wherein an operator sequentially unlocks blades 22b, 22c, 24b, 24c from their current configuration, shifts blade 22b, 22c, 24b, 24c to their desired configuration and then locks blades 22b, 22c, 24b, 24c in the desired configuration. Alternatively, operation of blades 22b, 22c and blades 24b, 24c between the radially extending operating configuration and the aftwardly extending storage configuration could be automated using, for example, electrically driven actuators. In storage mode, aircraft 10 occupies minimal ground space and has a suitable geometry for crating and/or palletizing for storage and/or transportation with other similar aircraft 10.

As best seen in FIG. 1B, aircraft 10 has a vertical takeoff and landing mode in which aircraft 10 has a generally vertical attitude. As illustrated, blades 22b, 22c of rotor assembly 22 are in the radially extending operating configuration generally perpendicular to longitudinal fuselage axis 42 of aircraft 10. Similarly, blades 24b, 24c of rotor assembly 24 are in the radially extending operating configuration generally perpendicular to longitudinal fuselage axis 42 of aircraft 10. Blades 22b, 22c, 24b, 24c preferably have little or no twist and have generally symmetrical airfoils. It should be understood, however, that blades 22b, 22c and blades 24b, 24c could have other blade designs that are known to those having ordinary skill in the art. As discussed herein, the pitch of blades 22b, 22c may be collectively and cyclically controlled using a dedicated rise and fall swash plate. Similarly, the pitch of blades 24b, 24c may be collectively and cyclically controlled using dedicated a rise and fall swash plate.

In the illustrated embodiment, when viewed from above, rotor assembly 22 rotates in a counterclockwise direction, as indicated by directional motion arrows 44, and rotor assembly 24 rotates in a clockwise direction, as indicated by directional motion arrows 46. As discussed herein, rotor assemblies 22, 24 are preferably coupled to the same drive system such that rotor assemblies 22, 24 operate at the same rotational speed. In addition, rotor assemblies 22, 24 preferably have a substantially similarly or identical design such that counter rotation of rotor assemblies 22, 24 at the same rotational speed results in torque matching of aircraft 10 in vertical takeoff and landing mode. In this manner, aircraft 10 has vertical thrust and is stable relative to rotation about longitudinal fuselage axis 42 in vertical takeoff and landing mode including during hover operations. As illustrated, pusher propeller 38 may remain stationary in vertical takeoff and landing mode. Alternatively, pusher propeller 38 may be rotating in vertical takeoff and landing mode to provide additional vertical thrust.

As best seen in FIG. 1C, aircraft 10 has a forward flight mode in which aircraft 10 has a generally horizontal attitude. As illustrated, blades 22b, 22c of rotor assembly 22 are in the radially extending operating configuration generally perpendicular to longitudinal fuselage axis 42 of aircraft 10. Similarly, blades 24b, 24c of rotor assembly 24 are in the radially extending operating configuration generally perpendicular to longitudinal fuselage axis 42 of aircraft 10. As illustrated, the counter rotation of rotor assemblies 22, 24 has stopped and blades 22b, 22c, 24b, 24c have been turned such that the leading edges of the airfoils are generally forward forming a dual wing configuration to provide lift for aircraft 10. In the illustrated embodiment, blades 22b, 22c and blades 24b, 24c are scissored relative to one another forming an x-wing configuration to reduce drag during forward flight. As illustrated, pusher propeller 38 is rotating in forward flight mode, as indicated by motion arrows 50, to provide forward thrust. Pusher propeller 38 is preferably a fixed pitch propeller having relatively high disc loading. In forward flight mode, pitch adjustments of blades 22b, 22c, 24b, 24c may be used for roll control, with yaw and pitch control of aircraft 10 being provided by rudders 30, 32 and elevators 34, 36 of tailboom assembly 26.

Referring next to FIGS. 2A-2P in the drawings, sequential flight-operating scenarios of a tail sitter aircraft operable for dual rotor-to-wing conversion are depicted. Tail sitter aircraft 10 may be a manned or unmanned aircraft and may be operated responsive to onboard pilot flight control, remote flight control or autonomous flight control. Tail sitter aircraft 10 is preferably a fly-by-wire aircraft operated by a flight control system including an onboard flight control computing system, such as a digital flight control computer, and a plurality of sensor and controller operably associated with the mechanical systems of aircraft 10 including the engine, the transmissions, the rotor assemblies, the pitch control assemblies and the pusher propeller, to name a few. As best seen in FIG. 2A, tail sitter aircraft 10 is hovering in its vertical takeoff and landing mode with longitudinal fuselage axis 42 in a generally vertical attitude. Rotor assemblies 22, 24 are providing vertical thrust and operating in counter rotation as indicated by directional motion arrows 44, 46. Rotor assemblies 22, 24 are preferably torque matched, thus preventing aircraft 10 from rotating about longitudinal fuselage axis 42. In the illustrated embodiment, pusher propeller 38 is stationary in the current hover.

As best seen in FIG. 2B, tail sitter aircraft 10 is beginning a transition from vertical takeoff and landing mode to forward flight mode. Aircraft 10 embarks on a vertical assent to a desired elevation with longitudinal fuselage axis 42 in a generally vertical attitude, rotor assemblies 22, 24 providing vertical thrust as indicated by directional motion arrows 44, 46 and pusher propeller 38 operating as indicated by motion arrows 50. Once aircraft 10 reaches the desired elevation, longitudinal fuselage axis 42 is rotated toward a nose-down attitude to perform the dual rotor-to-wing conversion, as seen in the progression of FIGS. 2C-2E. In FIG. 2C, rotor assemblies 22, 24 are operating to provide thrust as indicated by directional motion arrows 44, 46 and pusher propeller 38 is operating to provide thrust as indicated by motion arrows 50. In FIG. 2D, after aircraft 10 is in the nose down attitude, aircraft 10 looses altitude while airspeed increases. During this maneuver, power to rotor assemblies 22, 24 is shut down and aerodynamic braking slows and stops the rotation of rotor assemblies 22, 24 about the fuselage. In addition, pusher propeller 38 is operating as indicated by motion arrows 50.

Collective control is then used to adjust the pitch of blades 22b, 22c of rotor assembly 22 and blades 24b, 24c of rotor assembly 24 such that the leading edges of the airfoils are generally forward, as best seen in FIG. 2E, to complete the dual rotor-to-wing conversion. Rotor assemblies 22, 24 are now in a dual wing configuration that is operable to provide lift for aircraft 10 responsive to forward airspeed. In the illustrated embodiment, blades 22b, 22c and blades 24b, 24c are scissored relative to one another forming an x-wing configuration to reduce drag. Once in this configuration, pusher propeller 38 is operable to provide the required forward thrust, as indicated by motion arrows 50, and blades 22b, 22c, 24b, 24c are operable to provide lift, enabling the forward flight mode of aircraft 10, as best seen in FIG. 2F.

As tail sitter aircraft 10 approaches the destination, longitudinal fuselage axis 42 is shifted from the horizontal attitude of forward flight mode back to the vertical attitude of vertical takeoff and landing mode. Depending upon factors such as airspeed, altitude, prevailing conditions and other factors known to those having ordinary skill in the art, aircraft 10 may engage in a variety of maneuvers to achieve this transition. For example, as best seen in FIG. 2G, aircraft 10 remains in the forward flight mode at a desired altitude with pusher propeller 38 operating to provide forward thrust, as indicated by motion arrows 50, and blades 22b, 22c, 24b, 24c providing lift. Aircraft 10 is now ready to perform the dual wing-to-rotor conversion, as seen in the progression of FIGS. 2G-2I. As illustrated in FIG. 2H, longitudinal fuselage axis 42 is rotated toward a nose-down attitude, enabling aircraft 10 to increase airspeed while decreasing altitude. Collective control is then used to adjust the pitch of blades 22b, 22c of rotor assembly 22 and blades 24b, 24c of rotor assembly 24 such that the leading edges of the airfoils are oriented for rotary motion. Torque and rotational energy is now applied to rotor assemblies 22, 24 causing rotor assemblies 22, 24 to begin counter rotation, as indicated by directional motion arrows 44, 46 in FIG. 2I, thereby completing the dual wing-to-rotor conversion. During the dual wing-to-rotor conversion process of rotor assemblies 22, 24, pusher propeller 38 continuously provides thrust, as indicated by motion arrows 50. When rotor assemblies 22, 24 reach the desired rotational speed and thrust output, aircraft 10 can turn nose up, as best seen in FIG. 2J, with pusher propeller 38 operating to provide thrust, as indicated by motion arrows 50. Thereafter, aircraft 10 can return to the vertical takeoff and landing mode with rotor assemblies 22, 24 providing the required vertical thrust output and with pusher propeller 38 disengaged from engine power, as best seen in FIG. 2K.

In another example, as best seen in FIG. 2L, aircraft 10 remains in the forward flight mode with pusher propeller 38 operating to provide forward thrust, as indicated by motion arrows 50, and blades 22b, 22c, 24b, 24c providing lift. Aircraft 10 is now ready to perform the dual wing-to-rotor conversion, as seen in the progression of FIGS. 2L-2N. As illustrated in FIG. 2M, starting from a desired altitude, longitudinal fuselage axis 42 is rotated toward a nose-up attitude. Collective control is then used to adjust the pitch of blades 22b, 22c of rotor assembly 22 and blades 24b, 24c of rotor assembly 24 such that the leading edges of the airfoils are oriented for rotary motion. Torque and rotational energy is now applied to rotor assemblies 22, 24 causing rotor assemblies 22, 24 to begin counter rotation, as indicated by directional motion arrows 44, 46 in FIG. 2N, thereby completing the dual wing-to-rotor conversion. During the dual wing-to-rotor conversion process of rotor assemblies 22, 24, pusher propeller 38 continuously provides thrust, as indicated by motion arrows 50. As rotor assemblies 22, 24 reach the desired rotational speed and thrust output, aircraft 10 continues to ascend, as best seen in FIG. 2O, with pusher propeller 38 operating to provide thrust, as indicated by motion arrows 50. Thereafter, aircraft 10 can return to the vertical takeoff and landing mode with rotor assemblies 22, 24 providing the required vertical thrust output and with pusher propeller 38 disengaged from engine power, as best seen in FIG. 2P.

Referring next to FIG. 3 in the drawings, a systems diagram of a tail sitter aircraft operable for dual rotor-to-wing conversion of the present disclosure is generally designated 100. As discussed herein, the aircraft of the present disclosure may be operated autonomously responsive to commands generated by a flight control system 102 including, for example, a digital flight control system that preferably includes a non-transitory computer readable storage medium including a set of computer instructions executable by a processor. Aspects of flight control system 102 may be implemented on a general-purpose computer, a special purpose computer or other machine with memory and processing capability. For example, flight control system 102 may include one or more memory storage modules including, but is not limited to, internal storage memory such as random access memory, non-volatile memory such as read only memory, removable memory such as magnetic storage memory, optical storage, solid-state storage memory or other suitable memory storage entity. Aspects of flight control system 102 may be microprocessor-based systems operable to execute program code in the form of machine-executable instructions. In addition, flight control system 102 may be selectively connectable to other computer systems via a proprietary encrypted network, a public encrypted network, the Internet or other suitable communication network that may include both wired and wireless connections.

In the illustrated embodiment, flight control system 102 includes a command module 104 and a monitoring module 106. It is to be understood by those having ordinary skill in the art that these and other modules executed within flight control system 102 may be implemented in a variety of forms including hardware, software, firmware, special purpose processors and combinations thereof. Flight control system 102 including a plurality of sensors 108 that obtain input from a variety of sources such as data relating to parameters of the various mechanical systems 110. In addition, sensors 108 may obtain data relating to other important flight or mission parameters such as positioning data, attitude data, speed data, environmental data, temperature data, target data and the like. Flight control system 102 including a plurality of controllers 112 that provide inputs to the various mechanical systems 110 to enable operations.

In the illustrated embodiment, mechanical systems 110 include an engine 114, transmissions 118, 120, rotor assemblies 122, 124, pitch control assemblies 126, 128 and pusher propeller 130. Engine 114 may be may be liquid fuel powered engine such as gasoline, jet fuel or diesel powered engine including a rotary engine such as a dual rotor or tri rotor engine or other high power-to-weight ratio engine. Such a liquid fuel powered engine may return power to power system 132 via a generator during rotary operations. Alternatively, engine 114 may be an electric motor operated responsive electrical power supplied power systems 132. Preferably, however, engine 114 is a hybrid drive system including both a liquid fuel powered engine and one or more electric motors. In this configuration, for example, the liquid fuel powered engine may be used to provide all required rotary power to pusher propeller 130 in forward flight mode and may return power to power system 232 via a generator during rotary operations. During vertical takeoff and landing mode, the rotary power output of the liquid fuel powered engine may be augmented by the electrical motor to supply the required rotary power to rotor assemblies 122, 124.

Engine 114 is mechanically coupled to transmission 118 via a drive shaft or other suitable connection. Transmission 118 includes one or more clutch assemblies or other suitable engagement assemblies to enable selective coupling and decoupling between engine 114 and transmission 118 such that engine power to rotor assemblies 122, 124 can be engaged in vertical takeoff and landing mode and disengaged in forward flight mode. Transmission 118 is preferably located between rotor assemblies 122, 124 and includes a spiral bevel gearbox having suitable reduction for enabling counter rotation of rotor assemblies 122, 124 at the same rotational speed. Rotor assemblies 122, 124 are preferably relatively low disc loading rotors having little or no twist and symmetrical airfoils. Pitch control assembly 126 controls the pitch of the blades of rotor assembly 122 while pitch control assembly 128 controls the pitch of the blades of rotor assembly 124. Pitch control assemblies 126, 128 preferably include rise and fall swash plates operable to provide full helicopter type pitch control including both collective and cyclic pitch control in vertical takeoff and landing mode, collective pitch control in forward flight mode and collective pitch control during dual rotor-to-wing and dual wing-to-rotor conversions. More specifically, pitch control assemblies 126, 128 are operable to adjust the pitch of the blades such that the leading edges of the airfoils are generally forward for forward flight mode. In addition, pitch control assemblies 126, 128 are operable to adjust the pitch of the blades during forward flight mode to provide roll control for the aircraft.

Engine 114 is mechanically coupled to transmission 120 via a drive shaft or other suitable connection. Transmission 120 includes a clutch assembly or other suitable engagement assembly to enable selective coupling and decoupling between engine 114 and transmission 120 such that engine power to pusher propeller 130 can be engaged and disengaged depending on the operation of the aircraft. Transmission 120 preferably includes a gearbox having suitable reduction for pusher propeller 130. Pusher propeller 130 is preferably a relatively high disc loading propeller that may be protected by a shroud. In some embodiments, engine 114 may be coupled directly to pusher propeller 130 without the need for transmission 120.

In one operational example, flight control system 102, which receives electrical power from power systems 132, may receive a mission from an external source such as a command and control system. Thereafter, flight control system 102 may autonomously control all aspects of flight of an aircraft 10 of the present disclosure. During the various operating modes of aircraft 10 including vertical takeoff and landing mode, hovering mode, forward flight mode and transitions therebetween, command module 104 provides commands to controllers 112 to establish the desired operating positions of the various mechanical systems 110. For example, these commands may relate to the engagement or disengagement of engine 114 with transmission 118, the engagement or disengagement of engine 114 with transmission 120, the position of pitch control assembly 126 and the position of pitch control assembly 128, to name a few. Flight control system 102 receives feedback from sensors 108 that are associated with the various mechanical systems 110. This feedback is processes by monitoring module 106, which supplies correction data and other information to command module 104. Monitoring module 106 preferably receives and processes additional sensor information such as position data, attitude data, speed data, environmental data, fuel data, temperature data, location data and the like. Monitoring module 106 provides the processed information to command module 104 to further enhance autonomous flight control capabilities. In some embodiments, some or all of the autonomous control capability of flight control system 102 may be augmented or supplanted by remote flight control from a command and control station via a communication link, such as a wireless communication channel. Alternatively or additionally, some or all of the autonomous and/or remote flight control of flight control system 102 may be augmented or supplanted by onboard pilot flight control in manned embodiments.

Figure 4:
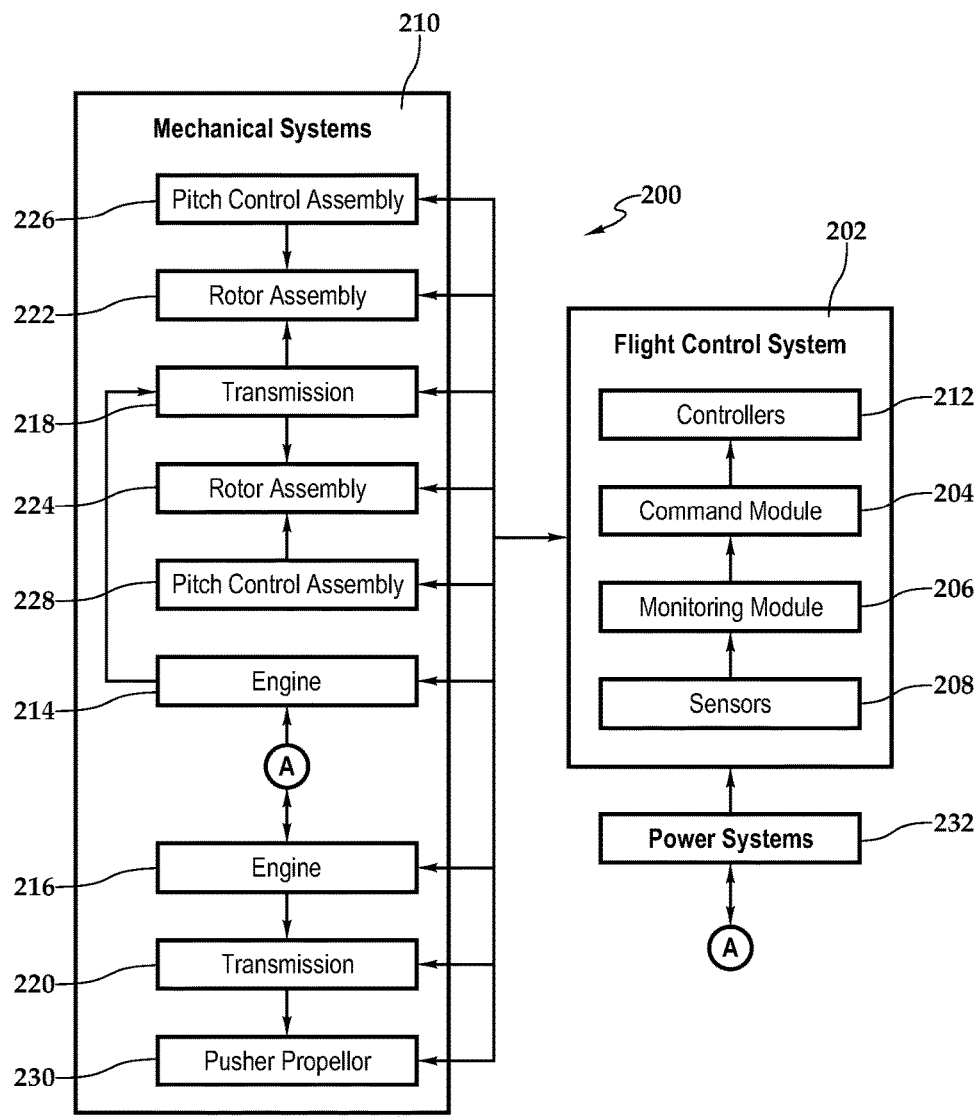
FIG. 4 is a systems diagram of a tail sitter aircraft operable for dual rotor-to-wing conversion in accordance with embodiments of the present disclosure.

Referring next to FIG. 4 in the drawings, a systems diagram of a tail sitter aircraft operable for dual rotor-to-wing conversion of the present disclosure is generally designated 200. In the illustrated embodiment, flight control system 202 includes a command module 204, a monitoring module 206, a plurality of sensors 208 and a plurality of controllers 212. In the illustrated embodiment, mechanical systems 110 include engines 214, 216, transmissions 218, 220, rotor assemblies 222, 224, pitch control assemblies 226, 228 and pusher propeller 230. Engine 214 is preferably an electric motor powered by batteries of power systems 232. Engine 214 drives transmission 218 and rotor assemblies 222, 224 in a manner similarly to that discussed above with reference to systems 100, however transmission 218 may not require a clutch as discussed herein. Unlike systems 100, however, systems 200 include dedicated pusher propeller engine 216 that is preferably a liquid fuel powered engine operable to return power to power system 232 via a generator during rotary operations. In the illustrated embodiment, engine 216 drives pusher propeller 230 via a transmission 220 that preferably includes a gearbox having suitable reduction. Engine 216 may alternatively provide direct drive to pusher propeller 230.

In the preferred configuration of systems 200, liquid fuel can be used to enable endurance in forward flight mode by powering engine 216 to drive pusher propeller 230. In addition, engine 216 may be selectively operated to drive pusher propeller 230 as desired based upon the specific operational requirements of the aircraft. Electrical power can be used to satisfy the high power demands of driving rotor assemblies 222, 224 by powering engine 214 in vertical takeoff and landing mode. In addition, engine 214 may be selectively operated to drive rotor assemblies 222, 224 as desired based upon the specific operational requirements of the aircraft. Accordingly, the use of dedicated engines 214, 216 may provide a more efficient overall drive system for an aircraft 10 of the present disclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tail sitter aircraft comprising:
    a fuselage having a forward portion and an aft portion, the forward portion including first and second rotor stations;
    a first rotor assembly positioned proximate the first rotor station;
    a second rotor assembly positioned proximate the second rotor station;
    a tailboom assembly extending from the aft portion of the fuselage, the tailboom assembly including a plurality of control surfaces and a plurality of landing members; and
    a pusher propeller extending from the tailboom assembly;
    wherein, the plurality of control surfaces are forward of the pusher propeller;
    wherein, the plurality of landing members are coupled to the plurality of control surfaces and extend aftward to terminate aft of the pusher propeller;
    wherein, in a vertical takeoff and landing mode, the first and second rotor assemblies rotate about the fuselage to provide vertical thrust;
    wherein, in a forward flight mode, rotation of the pusher propeller provides forward thrust and the first and second rotor assemblies are non-rotatable about the fuselage forming a dual wing configuration to provide lift; and
    wherein, the first and second rotor assemblies include rotor blades and, in a storage mode, the rotor blades of the first and second rotor assemblies are folded aftward toward the pusher propeller such that the rotor blades are generally parallel with a longitudinal fuselage axis to reduce aircraft geometry.

2. The tail sitter aircraft as recited in claim 1 wherein the first and second rotor assemblies each further comprise two rotor blades.

3. The tail sitter aircraft as recited in claim 1 wherein the first and second rotor assemblies each have cyclic control and collective control.

4. The tail sitter aircraft as recited in claim 1 wherein the first and second rotor assemblies are generally torque matched in vertical takeoff and landing mode.

5. The tail sitter aircraft as recited in claim 1 wherein the first and second rotor assemblies rotate in opposite directions in vertical takeoff and landing mode.

6. The tail sitter aircraft as recited in claim 1 wherein the pusher propeller further comprises a fixed pitch pusher propeller.

7. The tail sitter aircraft as recited in claim 1 wherein the pusher propeller is not powered in vertical takeoff and landing mode.

8. The tail sitter aircraft as recited in claim 1 wherein the dual wing configuration further comprises an x-wing configuration.

9. The tail sitter aircraft as recited in claim 1 wherein the dual wing configuration provides roll control in forward flight mode.

10. The tail sitter aircraft as recited in claim 1 further comprising an engine operable to provide torque and rotational energy to the first and second rotor assemblies and the pusher propeller.

11. The tail sitter aircraft as recited in claim 1 wherein the engine further comprises an electrical motor.

12. The tail sitter aircraft as recited in claim 1 further comprising a first engine operable to provide torque and rotational energy to the first and second rotor assemblies and a second engine operable to provide torque and rotational energy to the pusher propeller.

13. The tail sitter aircraft as recited in claim 1 wherein, in a storage mode, the aftward folded rotor blades of the first rotor assembly are clocked about ninety degrees relative to the aftward folded rotor blades of the second rotor assembly.

14. A method of operating a tail sitter aircraft comprising:
    supporting a fuselage in a generally vertical attitude on a surface with a plurality of landing members of a tailboom assembly, the tailboom assembly including a plurality of control surfaces;
    folding rotor blades of first and second rotor assemblies aftward toward a pusher propeller such that the rotor blades are generally parallel with a longitudinal fuselage axis to reduce aircraft geometry in a storage mode;
    rotating first and second rotor assemblies about the fuselage to provide vertical thrust in a vertical takeoff and landing mode;
    rotating the pusher propeller to provide forward thrust in a forward flight mode; and
    forming a dual wing configuration with the first and second rotor assemblies by preventing rotation of the first and second rotor assemblies about the fuselage to provide lift in the forward flight mode;
    wherein, the plurality of control surfaces are forward of the pusher propeller; and
    wherein, the plurality of landing members are coupled to the plurality of control surfaces and extend aftward to terminate aft of the pusher propeller.

15. The method as recited in claim 14 wherein rotating the first and second rotor assemblies about the fuselage to provide vertical thrust further comprises operating the first and second rotor assemblies responsive to cyclic control and collective control.

16. The method as recited in claim 14 wherein rotating the first and second rotor assemblies about the fuselage to provide vertical thrust further comprises generally torque matching the first and second rotor assemblies.

17. The method as recited in claim 14 wherein rotating the first and second rotor assemblies about the fuselage to provide vertical thrust further comprises rotating the first and second rotor assemblies in opposite directions.

18. The method as recited in claim 14 wherein forming the dual wing configuration with the first and second rotor assemblies further comprises forming an x-wing configuration with the first and second rotor assemblies.

19. The method as recited in claim 14 further comprising performing a dual rotor-to-wing conversion of the first and second rotor assemblies by stopping the rotation of the first and second rotor assemblies about the fuselage and adjusting an angle of attack of each rotor blade of the first and second rotor assemblies.

20. The method as recited in claim 14 further comprising performing a dual wing-to-rotor conversion of the first and second rotor assemblies by reengaging rotation of the first and second rotor assemblies about the fuselage.

* * * * *